United States Patent
Jayaraman et al.

(10) Patent No.: US 6,901,243 B2
(45) Date of Patent: May 31, 2005

(54) METHOD AND APPARATUS FOR MITIGATING ADJACENT CHANNEL INTERFERENCE IN A WIRELESS COMMUNICATION SYSTEM

(75) Inventors: Srikant Jayaraman, San Diego, CA (US); John E. Smee, San Diego, CA (US); Ivan Jesus Fernandez Corbaton, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 259 days.

(21) Appl. No.: 10/007,298

(22) Filed: Nov. 8, 2001

(65) Prior Publication Data

US 2003/0087622 A1 May 8, 2003

(51) Int. Cl.[7] .................................................. H04B 1/10
(52) U.S. Cl. ..................... 455/63.1; 455/307; 455/63.2; 455/278.1; 455/296; 375/350
(58) Field of Search ................................ 455/63.1, 307, 455/63.2, 278.1, 296, 266, 447, 65, 63.4, 63.3; 375/350, 346

(56) References Cited

U.S. PATENT DOCUMENTS

| | | | |
|---|---|---|---|
| 3,623,098 A | * 11/1971 | Jones et al. ................... | 375/346 |
| 5,363,407 A | * 11/1994 | Ramesh et al. ............... | 455/63.1 |
| 5,715,282 A | * 2/1998 | Mansouri et al. ............. | 455/307 |
| 5,740,536 A | * 4/1998 | Benveniste .................... | 455/447 |
| 5,809,399 A | * 9/1998 | Tuutijarvi et al. ............ | 455/63.1 |
| 5,818,389 A | * 10/1998 | Lazar ............................. | 455/278.1 |
| 6,047,171 A | 4/2000 | Khayrallah et al. | |
| 6,178,211 B1 | 1/2001 | Whikehart et al. | |
| 6,438,356 B1 | * 8/2002 | Lilja et al. .................... | 455/63.1 |
| 6,574,456 B2 | * 6/2003 | Hamabe ......................... | 455/63.3 |

FOREIGN PATENT DOCUMENTS

| | | | | |
|---|---|---|---|---|
| DE | 4244630 A | | 7/1993 | |
| DE | Wo 00/72454 | * | 1/2001 | ............ H04B/1/10 |
| WO | 0072454 A | | 11/2000 | |

* cited by examiner

Primary Examiner—Edward F. Urban
Assistant Examiner—Lana Le
(74) Attorney, Agent, or Firm—Philip R. Wadsworth; Thien T. Nguyen

(57) ABSTRACT

Techniques for detecting and mitigating adjacent channel interference (ACI) in a wireless (e.g., CDMA) communication system. In one aspect, ACI may be determined by signaling or detected by filtering a pre-processed signal in each frequency range where ACI may be present (e.g., with a respective bandpass filter), estimating the energy of the filtered signal for each frequency range, comparing the estimated energy against an ACI threshold, and indicating the presence or absence of ACI at each frequency range based on the result of the comparison. In another aspect, a selectable filter (e.g., a FIR filter) having a number of possible filter responses (e.g., provided by a number of sets of filter coefficients) may be used to provide filtering for the pre-processed signal and to reject any detected ACI. One of the possible filter responses is selected for use depending on whether and where ACI has been detected.

16 Claims, 7 Drawing Sheets

METHOD AND APPARATUS FOR MITIGATING ADJACENT CHANNEL INTERFERENCE IN A WIRELESS COMMUNICATION SYSTEM

BACKGROUND

1. Field

The present invention relates generally to data communication, and more specifically to techniques for detecting and mitigating adjacent channel interference (ACI) in a wireless (e.g., CDMA) communication system.

2. Background

Wireless communication systems are widely deployed to provide various types of communication such as voice, data, and so on. These systems may be multiple-access systems capable of supporting communication with multiple users and may be based on code division multiple access (CDMA), time division multiple access (TDMA), frequency division multiple access (FDMA), or some other multiple access techniques. CDMA systems may provide certain advantages over other types of system, including increased system capacity.

A CDMA system may also be designed to implement known CDMA standards such as IS-95, cdma2000, IS-856, W-CDMA, other standards, and variants thereof. Each CDMA standard typically specifies a particular chip rate for spreading data prior to transmission and a particular minimum spacing between carrier signals on the forward link. The chip rate determines the bandwidth of a modulated signal transmitted on a CDMA channel, and the carrier frequency determines the center frequency of the modulated signal. For example, in IS-95A/B, cdma2000-1X, and cdma2000-1X EV, the chip rate is defined as 1.2288 Mcps and the minimum spacing between carrier signals is 1.23 MHz for cellular band (i.e., 800 MHz range) and 1.25 MHz for PCS band (i.e., 1900 MHz range).

Each CDMA standard typically further specifies a particular transmit mask for the modulated signal. The transmit mask defines the maximum and minimum amplitude values for the modulated signal over a range of frequencies. The transmit mask thus effectively band-limits each CDMA channel's baseband transmit pulse to less than half of the chip rate (i.e., $|f|<W/2$, where W is related to the chip rate and is equal to 1.2288 MHz for IS-95 and cdma2000-1X). Since the transmit mask specification is not stringent, each CDMA channel "bleeds" some amounts of signal energy into adjacent channels where it is perceived as adjacent channel interference (ACI).

ACI is one of the components that make up the total noise and interference observed at a receiver (e.g., a terminal). It can be shown that ACI increases the noise floor by limiting the maximum signal-to-noise-and-interference ratio (SINR) to approximately 13 dB and 15 dB for channel spacing of 1.23 MHz and 1.25 MHz, respectively, on the forward link.

In a CDMA system, the data for each user is spread over the entire system bandwidth. The spreading provides processing gain, with the amount of gain being dependent on the ratio of the system bandwidth to the data rate. When the data rate is low (e.g., for voice and low rate data), the processing gain is large and this allows the data to be recovered at a low SINR. For example, in IS-95A/B and cdma2000-1X systems, the terminals typically operate at an SINR of 0 dB or less. At such low SINR levels, the thermal noise and the interference due to transmissions from other transmitters dominate, and the contribution due to ACI is typically negligible in comparison to these other components.

However, as the data rate increases, the processing gain decreases and a higher SINR is needed to achieve the desired level of performance. For example, in a cdma2000-1X EV system, a SINR of approximately 10 dB is needed for the highest data rates supported on the forward link. ACI is then a non-negligible component that may have a large impact on the overall SINR.

There is therefore a need in the art for mitigating ACI in a CDMA system to achieve higher SINR levels needed for higher data rates.

SUMMARY

Aspects of the invention provide techniques for detecting and mitigating adjacent channel interference (ACI) in a wireless (e.g., CDMA) communication system. These techniques may be used to achieve higher SINR, which may be needed to support higher data rates.

In one aspect, techniques are provided to detect the presence and frequency locations of ACI in a "pre-processed" signal (i.e., after the front-end signal conditioning) having a desired signal component. In one scheme, ACI may be detected by (1) filtering the pre-processed signal in each of one or more (typically narrow-band) frequency ranges where ACI may be present, (2) estimating the energy of the filtered signal for each frequency range, (3) comparing the estimated energy for each frequency range against a respective ACI threshold, and (4) indicating the presence or absence of ACI at each frequency range based on the result of the comparison. Each frequency range may be filtered, for example, with a respective band-pass filter having a response approximately matched to the expected spectral profile of the ACI at this frequency range. Alternatively, the presence and locations of the ACI may be determined based on signaling (e.g., from a transmitter) or by some other means.

In another aspect, a selectable filter having a number of possible filter responses may be used to provide filtering for the pre-processed signal and to reject the detected ACI (if any). The selectable filter may be implemented, for example, with a finite impulse response (FIR) filter. A number of sets of filter coefficients may be used to provide the possible filter responses. One of the possible filter responses is selected for use depending on whether or not ACI has been detected and the frequency range(s) where ACI is detected.

Various aspects and embodiments of the invention are described in further detail below. The invention further provides methods, digital signal processors, receiver units, terminals, base stations, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1A:
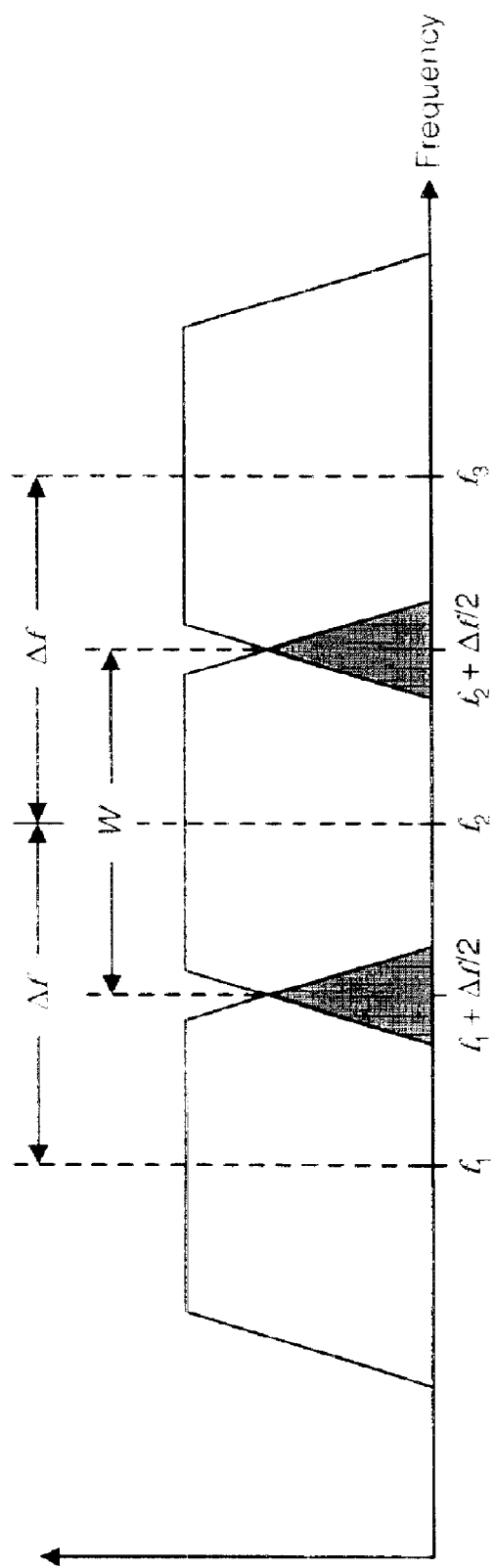
FIG. 1A is a diagram illustrating an example spectrum for a multi-channel CDMA system.

FIG. 1A is a diagram illustrating an example spectrum for a multi-channel CDMA system. In this example, three modulated signals are transmitted on three CDMA channels at center frequencies of $f_1$, $f_2$, and $f_3$, with the CDMA channels being separated by at least a specified minimum channel spacing of $\Delta f_{min}$ (i.e., $f_2-f_1=\Delta f \geq \Delta f_{min}$ and $f_3-f_2=\Delta f \geq \Delta f_{min}$). Each modulated signal is filtered or otherwise processed such that it conforms to a specified transmit mask. Because of the lax transmit mask specifications, the modulated signals overlap near the band edges. The overlap regions, which are shown by the shaded regions in FIG. 1A, represent adjacent channel interference (ACI).

Figure 1B:
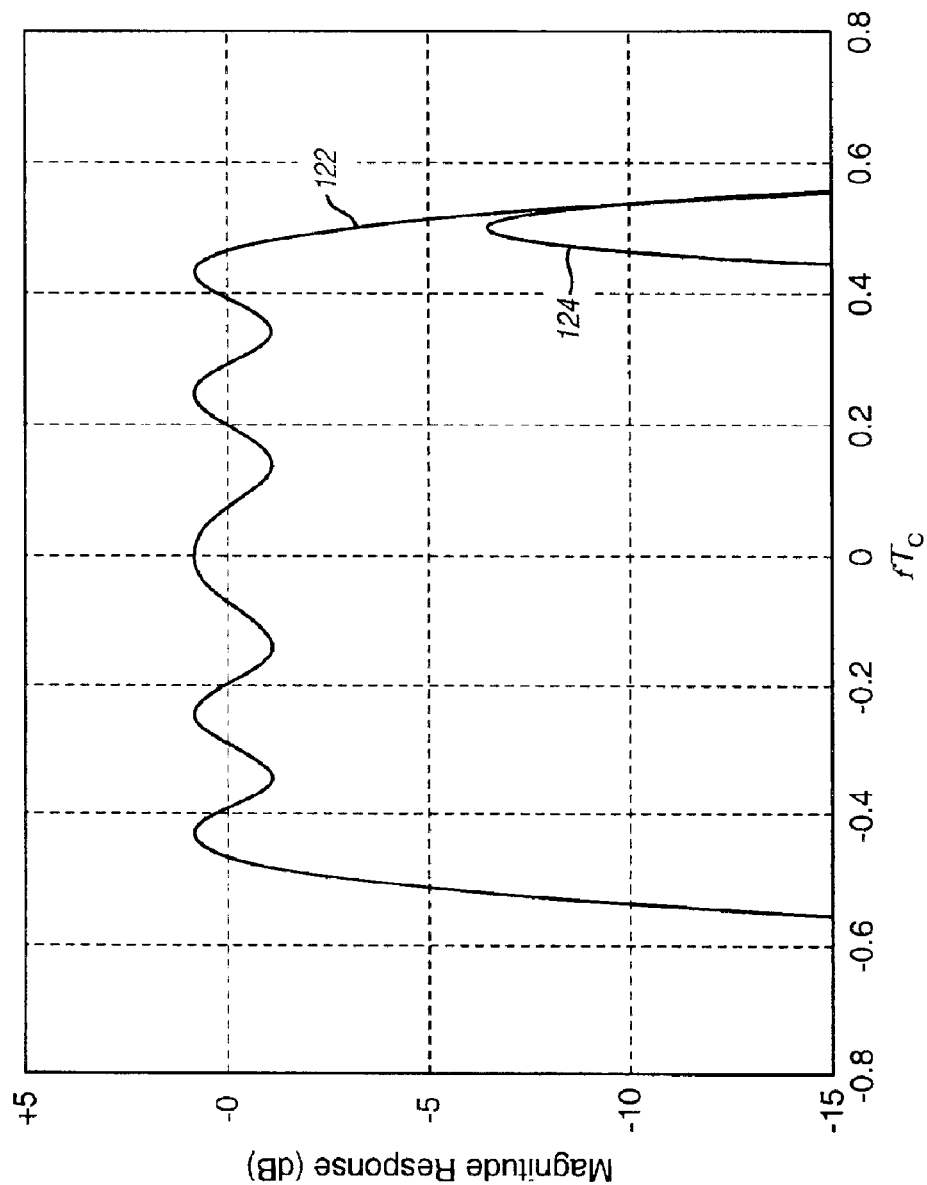
FIG. 1B is a diagram illustrating a baseband pulse-matched response for a modulated signal (e.g., the one centered at $f_1$ in FIG. 1A) and its adjacent channel interference (ACI)

FIG. 1B is a diagram illustrating a baseband pulse-matched response for one of the modulated signals (e.g., the one centered at $f_1$ in FIG. 1A). If the communication channel has a flat response and if the overall response of the front-end processing (e.g., the RF/IF stages and filters) at the receiver is approximately matched to the baseband transmit pulse, then the desired baseband signal has a spectrum 122 shown in FIG. 1B, and the ACI due to transmission on an adjacent upper CDMA channel has a response 124. As shown in FIG. 1B, the ACI is not spectrally white at the receiver but is instead localized to a range of frequencies near the band-edge. In this case, various techniques may be used to detect for the presence of ACI and, if detected, to mitigate its impact on performance.

Aspects of the invention provide various techniques to detect and mitigate ACI in order to improve performance. In one aspect, techniques are provided to determine the presence of ACI. This may be achieved by detecting the energy in each of a number of (narrow-band) frequency ranges where ACI may be present. Alternatively, the receiver may be informed of the presence of ACI via signaling or by some other means. In another aspect, a selectable filter having a number of possible filter responses is provided, with the particular filter response selected for use being dependent on whether or not ACI has been detected and where it has been detected. The selectable filter may be implemented with a bank of fixed filters, which may be implemented with a single filter and a number of sets of filter coefficients. These and other aspects and embodiments of the invention are described in further detail below.

Figure 2:
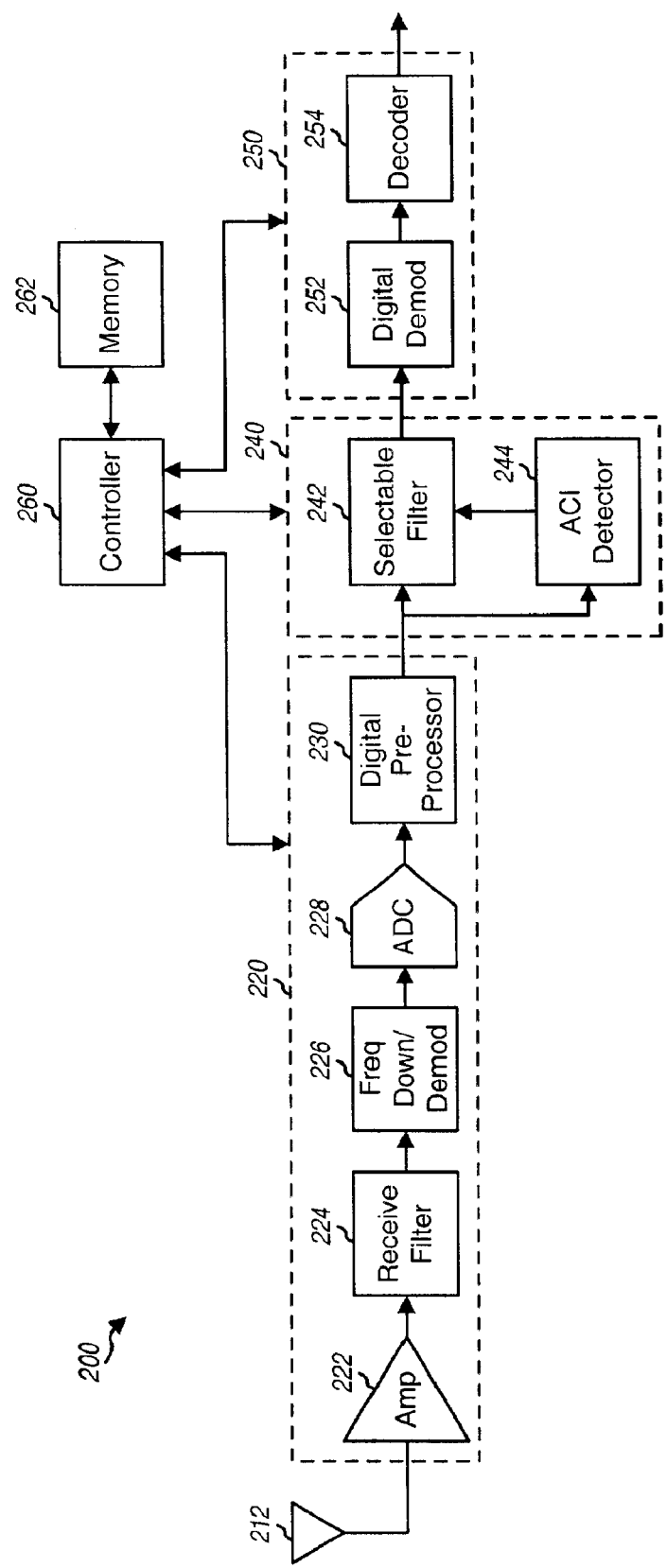
FIG. 2 is a block diagram of an embodiment of a receiver unit capable of implementing various aspects and embodiments of the invention.

FIG. 2 is a block diagram of an embodiment of a receiver unit 200 capable of implementing various aspects and embodiments of the invention. One or more signals transmitted from one or more transmitters are received by an antenna 212, and the received signal is provided to a signal processor 220 (which may also be referred to as a front-end unit).

Within signal processor 220, the received signal is amplified by an amplifier 222, filtered by a receive filter 224, frequency downconverted and quadrature demodulated by a frequency downconverter/demodulator 226, and digitized by one or more analog-to-digital converters (ADCs) 228 to provide (complex) ADC samples. The ADC samples are further pre-processed (e.g., filtered) by a digital pre-processor 230 to provide (complex) received data samples. For example, digital pre-processor 230 may perform baseband pulse-matched filtering, decimation, sample rate conversion, other digital signal processing operations, or any combination thereof. The received data samples are then provided to an ACI suppression unit 240.

In a typical receiver design, the conditioning of the received signal may be performed by one or more stages of amplifiers, filters, mixers, and so on. For example, the received signal may first be downconverted to an intermediate frequency (IF) with a first local oscillator (LO) signal and thereafter (quadrature) downconverted to baseband with a second LO signal. For simplicity, these various signal conditioning stages are lumped together into the blocks shown in FIG. 2. Other receiver designs may also be used and are within the scope of the invention.

In the embodiment shown in FIG. 2, ACI suppression unit 240 includes a selectable filter 242 coupled to an ACI detector 244. Selectable filter 242 filters the received data samples with a filter having a particular response that may be selected from among a number of possible responses, with the selected response being dependent on whether or not ACI has been detected and where it has been detected. As a specific example, a first filter response may be used if ACI is detected at only the upper band-edge of the desired signal (as shown in FIG. 1B), a second filter response may be used if ACI is detected at only the lower band-edge, a third filter response may be used if ACI is detected at both the upper and lower band-edges, and a fourth filter response may be used if no ACI has been detected. Selectable filter 242 may be implemented with a bank of filters having different responses, an adaptive filter having a response that may be adjusted by adapting the filter coefficients, or with some other filter designs.

ACI detector 244 detects for the presence or absence of ACI in the received signal. As a specific example, ACI detector 244 may be designed to detect whether ACI is present at the upper band-edge, at the lower band-edge, at both the upper and lower band-edges, or not present at all. ACI detector 244 then provides indications of the detected ACI to selectable filter 242. Various designs for selectable filter 242 and ACI detector 244 are described in further detail below.

The filtered samples from ACI suppression unit 240 are then provided to a receive (RX) data processor 250. In the embodiment shown in FIG. 2, RX data processor 250 includes a digital demodulator 252 coupled to a decoder 254. Demodulator 252 demodulates the filtered samples to provide demodulated data, and may be implemented with a rake receiver, an adaptive equalizer, some other demodulator design, or a combination thereof. Decoder 254 then decodes the demodulated data to provide decoded data.

A controller 260 directs various operations of signal processor 220, ACI suppression unit 240, and RX data processor 250. For example, controller 260 may direct the downconversion of the received signal such that the desired modulated signal is downconverted from RF to baseband in signal processor 220, provide the thresholds used for ACI detection in ACI detector 244 and the filter coefficients for selectable filter 242, and so on. A memory 262 provides storage for data (e.g., filter coefficients, threshold values, and so on) and program codes for controller 260.

ACI Detection

The presence or absence of ACI in the received signal may be detected or determined using various schemes. In one scheme, the presence of ACI is communicated via messages and/or signaling from a transmitter (e.g., a base station in the CDMA system) to a receiver (e.g., a terminal). For some system deployments, the system is aware of the particular CDMA channels being used, their center frequencies, whether or not ACI is present on any given CDMA channel, and the frequency locations of the ACI on each CDMA channel. ACI information (e.g., which may indicate whether or not there are active transmissions on adjacent CDMA channels for each active CDMA channel) may be conveyed to the terminal, for example, as a broadcast message on the Sync channel, via messaging during system configuration, or by some other means. Once the terminal is informed of the presence and frequency locations of the ACI, it can select the proper filter response for each CDMA channel to mitigate ACI.

In another scheme for detecting ACI, the received signal is analyzed for the presence and frequency locations of the ACI. The known characteristics of the ACI may be exploited to improve the accuracy of the ACI detection. For the example shown in FIGS. 1A and 1B, it is known that the ACI is located near the band-edges, if at all. In this case, bandpass filters may be used to filter and detect for the ACI.

Figure 3:
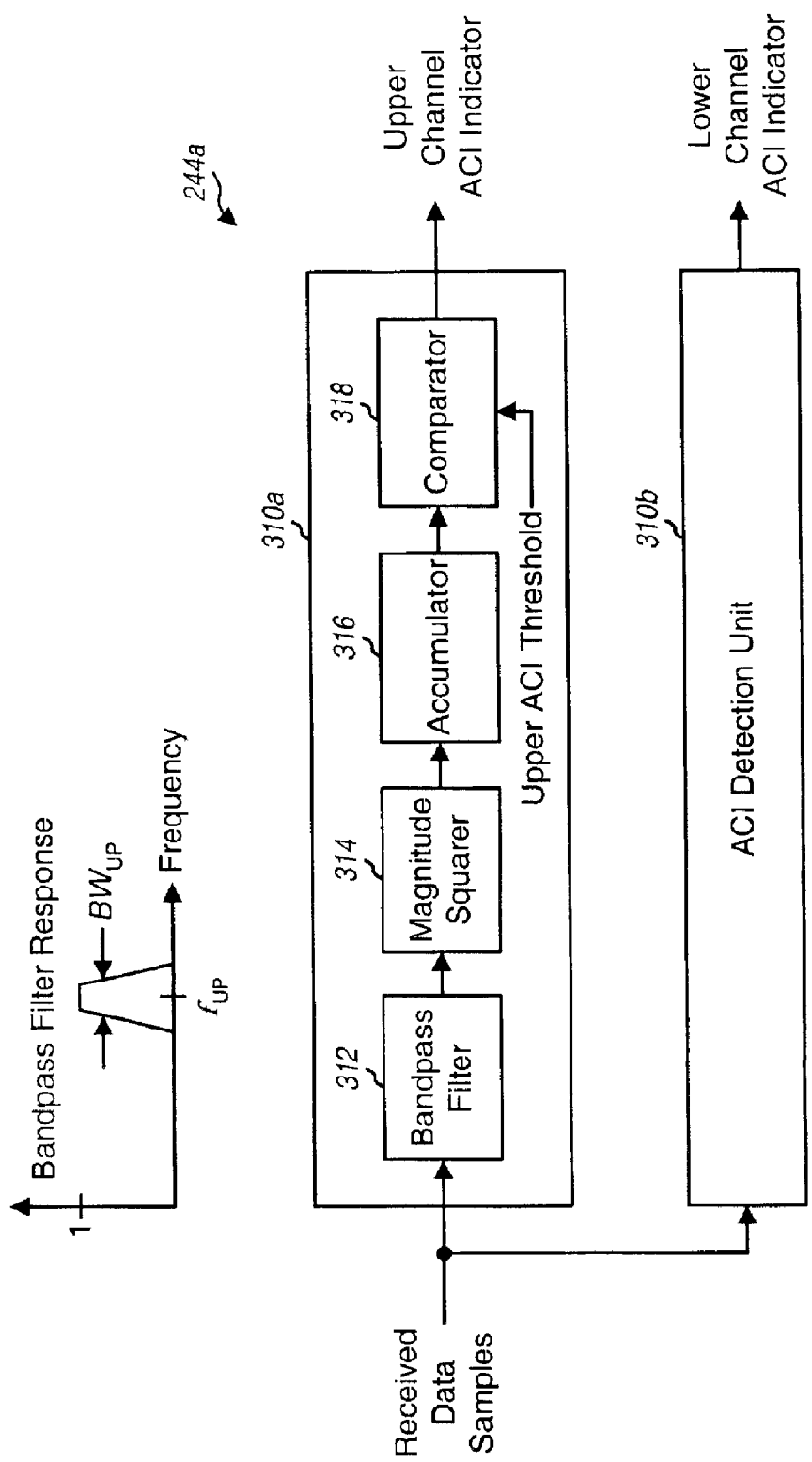
FIG. 3 is a block diagram of an ACI detector for detecting the presence and frequency locations of ACI in a signal.

FIG. 3 is a block diagram of an ACI detector 244a, which is an embodiment of ACI detector 244 in FIG. 2. In this embodiment, the received data samples from signal processor 220 are provided to a bank of ACI detection units 310, one unit for each frequency range where ACI is to be detected. For the example shown in FIGS. 1A and 1B, two ACI detection units 310a and 310b may be used, with unit 310a being designed to detect for ACI in the upper band-edge and unit 310b being designed to detect for ACI in the lower band-edge.

Each ACI detection unit 310 includes a bandpass filter 312 having a response that may be approximately matched to the expected spectrum (or spectral profile) of the ACI. For example, to detect for the ACI in the upper band-edge shown by plot 124 in FIG. 1B, bandpass filter 312 may be designed with a center frequency of $f_{up}$ and a bandwidth of $BW_{up}$.

The center frequency and bandwidth of bandpass filter 312 may be dependent on various factors such as (1) the actual channel spacing, $\Delta_f$, to the adjacent CDMA channel, (2) the chip rate, W, of the CDMA channels, (3) the transmit mask specifications, (4) any prior filtering that may have been performed at the receiver unit to derive the received data samples, and so on. If the received signal is filtered with a baseband pulse-matched filter and the ACI has the spectral profile as shown by plot 124 in FIG. 1B, then the bandpass filter's center frequency (at baseband) may be selected to lie halfway to the center frequency of the adjacent CDMA channel (i.e., $f_{up}=\Delta f/2$, where $\Delta f$ is the actual channel spacing) and the bandwidth may be selected to approximately match the ACI spectral profile The bandpass filters in ACI detection units 310a and 310b may be implemented as complex filters having center frequencies of $f_{up} \cong \Delta f/2$ and $f_{lower} \cong -\Delta f/2$, respectively, and bandwidths of $BW_{up}$ and $BW_{lower}$, respectively.

Bandpass filter 312 in each ACI detection unit 310 filters the received data samples and provides (complex) bandpass filtered samples (i.e., $I_{BPF}+jQ_{BPF}$). A magnitude squarer 314 then computes the square of the magnitude of each complex bandpass filtered sample (i.e., $I_{BPF}^2+Q_{BPF}^2$), which is representative of the power for that sample. An accumulator 316 then accumulates (i.e., non-coherently sums) a particular number of ($N_B$) magnitude squares from squarer 314 to provide an estimate of the energy of the bandpass filtered samples, which may be expressed as:

$$E_{ACI} = \sum_{i}^{N_B} \{I_{BPF}^2(i) + Q_{BPF}^2(i)\}. \quad \text{Eq (1a)}$$

Alternatively, the estimated energy, $E_{ACI}$, may be determined as:

$$E_{ACI} = \sum_{i}^{N_B} \{|I_{BPF}(i)| + |Q_{BPF}(i)|\}. \quad \text{Eq (1b)}$$

The estimated energy, $E_{ACI}$, may also be defined or determined based on some other formulation, and this is within the scope of the invention.

The estimated energy, $E_{ACI}$, for the frequency range covered by the bandpass filter is then compared against an ACI threshold by a comparator 318. If the estimated energy is greater than the ACI threshold, then an ACI indicator is set to indicate the presence of ACI at the frequency range (or location) covered by the bandpass filter. Otherwise, the ACI indicator is reset to indicate the absence of ACI at this frequency range.

The ACI threshold may be set based on various considerations. If the modulated signals on adjacent CDMA channels are transmitted from the same transmitter (e.g., the same base station), then these signals will experience similar channel conditions (i.e., similar fading and multipath effects). In this case, the power levels of the modulated signals, as received at the terminal, will be similar. The received signal is first filtered with a matched filter (to provide the response shown by plot 122 in FIG. 1B) and a bandpass filter with a response shown by plot 124 is used to detect ACI. The ACI threshold may be determined by empirical measurements, computer simulation, or by some other means.

ACI detector 244a may also be implemented in various manners. In one embodiment, the ACI detector is implemented in hardware. In another embodiment, the ACI detector may be implemented in software executed by a processor (e.g., controller 260). This embodiment may be advantageous since ACI detection typically needs to be performed only once at the start of a communication (or just before the very first communication) with a given system. In this case, the processor may sequentially detect for ACI at each of any number of frequency ranges where ACI may be expected (e.g., the upper band-edge and the lower band-edge). This implementation can provide the desired ACI detection with minimal (or no) additional hardware cost.

Various variations of the above-described schemes may be used to detect for the presence and frequency locations of the ACI, and this is within the scope of the invention. For example, highpass filters (instead of bandpass filters) may be used to detect for the presence of ACI in the received data samples.

Other schemes for detecting or determining the presence and frequency locations of ACI may also be used and are within the scope of the invention. In one such alternative scheme, the modulated signal in each of the two adjacent CDMA channels (instead of the modulated signal on the desired CDMA channel) is downconverted to baseband and detected. This may be achieved by adjusting the frequency of the LO signal(s) provided to frequency downconverter/ demodulator 226 to downconvert the received signal. The energy of the downconverted signal may be detected using a received signal strength indicator (RSSI) or some other techniques that are known in the art.

ACI Filtering

The filtering to mitigate ACI may be achieved using various filtering schemes. Some of these schemes are described below.

In one ACI filtering scheme, one of several different filters is selected for use depending on the presence and frequency locations of the ACI (if any). For the example shown in FIGS. 1A and 1B, the ACI is localized to a range of frequencies near each band-edge. A suitable ACI rejection filter (e.g., a notch filter) may then be used to attenuate the ACI.

Since the ACI's power spectrum overlaps part of the passband of the desired signal, the ACI may be attenuated by using a filter with sharp roll-off to remove as much of the interfering power as possible without removing an excessive amount of the desired signal power. This ACI rejection filter would likely increase inter-symbol interference (ISI) in the filtered data samples. A properly designed ACI rejection filter should balance the decrease in ACI with the increase in ISI. That is, the ACI rejection filter should maximize the SINR at its output, where the noise and interference comprise ACI, ISI, in-band interference (e.g., interference on the same CDMA channel from other transmitters), and filtered thermal noise.

An ACI rejection filter that maximizes SINR may be designed using a minimum mean-squared error (MMSE) criterion. An example design for such a filter proceeds as follows. In this example design, the filter is to be used when the ACI originates from the adjacent upper CDMA channel and there is no ACI from the adjacent lower CDMA channel. As is typical, the desired and upper CDMA channels are transmitted from the same transmitter (e.g., the same base station) and the same transmit power level is used for both channels. The transmitted signal, x(t), from the base station for both CDMA channels may then be expressed as:

$$x(t) = \Sigma a_n \sqrt{E_c} p(t-nT_C) + \Sigma b_n \sqrt{E_c} p^+(t-nT_C) \qquad \text{Eq (2)}$$

where p(t) is the unit-energy transmit pulse of the desired CDMA channel;

$p^+(t) = p(t)e^{j(2\pi \Delta ch)t}$ is the unit-energy transmit pulse of the upper CDMA channel;

$\{a_n\}$ and $\{b_n\}$ are the symbols transmitted on the desired and upper CDMA channels, respectively; and $T_C$ denotes the symbol period (i.e., $T_C = 1/W$).

The received signal, r(t), at the receiver's antenna may be expressed as:

$$r(t) = h(t) \otimes x(t) + n(t), \qquad \text{Eq (3)}$$

where h(t) is the impulse response of the communication channel, which may be a multipath channel;

n(t) is white Gaussian noise with a power spectral density of $N_0/2$; and $\otimes$ denotes a convolution operation.

In an embodiment, the received signal is filtered by a pulse-matched filter and then digitized at multiple times the chip rate (e.g., twice the chip rate, or chip×2) to provide the received data samples, $y_k$, which are then provided to the ACI rejection filter. In an embodiment, the ACI rejection filter is implemented as a finite impulse response (FIR) filter having 2M+1 taps and coefficients of $\{c_m : m = -M \ldots M\}$. Assuming chip×2 sampling, the filtered data samples, $\hat{a}_k$, from the FIR filter may be expressed as:

$$\hat{a}_k = \sum_{m=-M}^{M} c_m \cdot y_{mT_C/2-k}. \qquad \text{Eq (4)}$$

For the MMSE criterion, the filter coefficients are selected to minimize the mean square error, MSE, which may be expressed as:

$$MSE = E\{|a_k - \hat{a}_k|^2\}, \qquad \text{Eq (5)}$$

where $a_k$ is the actual symbol and E is the expectation operation. This is a simple problem of finding a Wiener filter, and the solution depends, in general, on the multipath channel response, h(t). As a simplification, which is especially valid if an adaptive equalizer is used subsequently to compensate for the multipath channel, the channel response is assumed to be flat (i.e., $F\{h(t)\} = 1$, where F denotes a Fourier Transform). The filter coefficients, $c_m$, may then be determined with this simplification of $h(t) = \delta(t)$. Also, since the ACI rejection filter is intended to compensate primarily for ACI, the geometry, $E_c/N_0$ may be selected to be at the high end of the operating range of the system (which is approximately 15 dB for cdma2000-1X EV).

The coefficients for the Wiener filter may be determined by a routine procedure known in the art and not described herein.

Figure 1C:
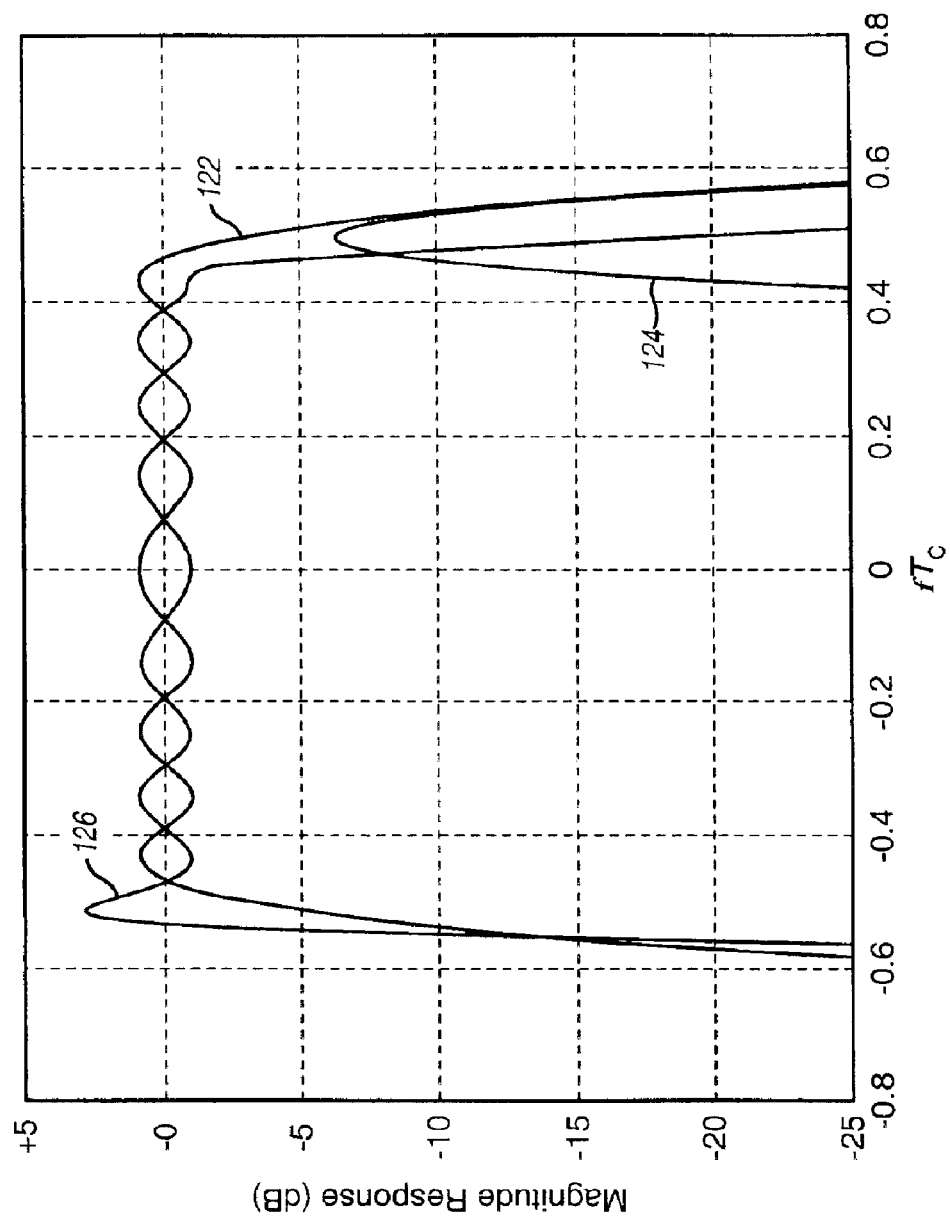
FIG. 1C is a diagram illustrating a response for an ACI rejection filter designed to remove ACI from an adjacent upper CDMA channel.

FIG. 1C is a diagram illustrating a response for an ACI rejection filter designed to remove ACI from an adjacent upper CDMA channel. In this example, the ACI rejection filter is implemented as a 101-tap FIR filter designed for a channel spacing of $\Delta f = 1.23$ MHz, and the response of the filter is shown by plot 126 in FIG. 1C. As shown in FIG. 1C, the filter has a sharp roll-off near the upper band-edge (i.e., at $f T_C = 0.5$) and a passband response that approximately inverts the ripples in the transmit pulse (which is shown by plot 122 in FIG. 1C). This filter response effectively attenuates the upper channel ACI while minimally enhancing other signal distortions.

Figure 4:
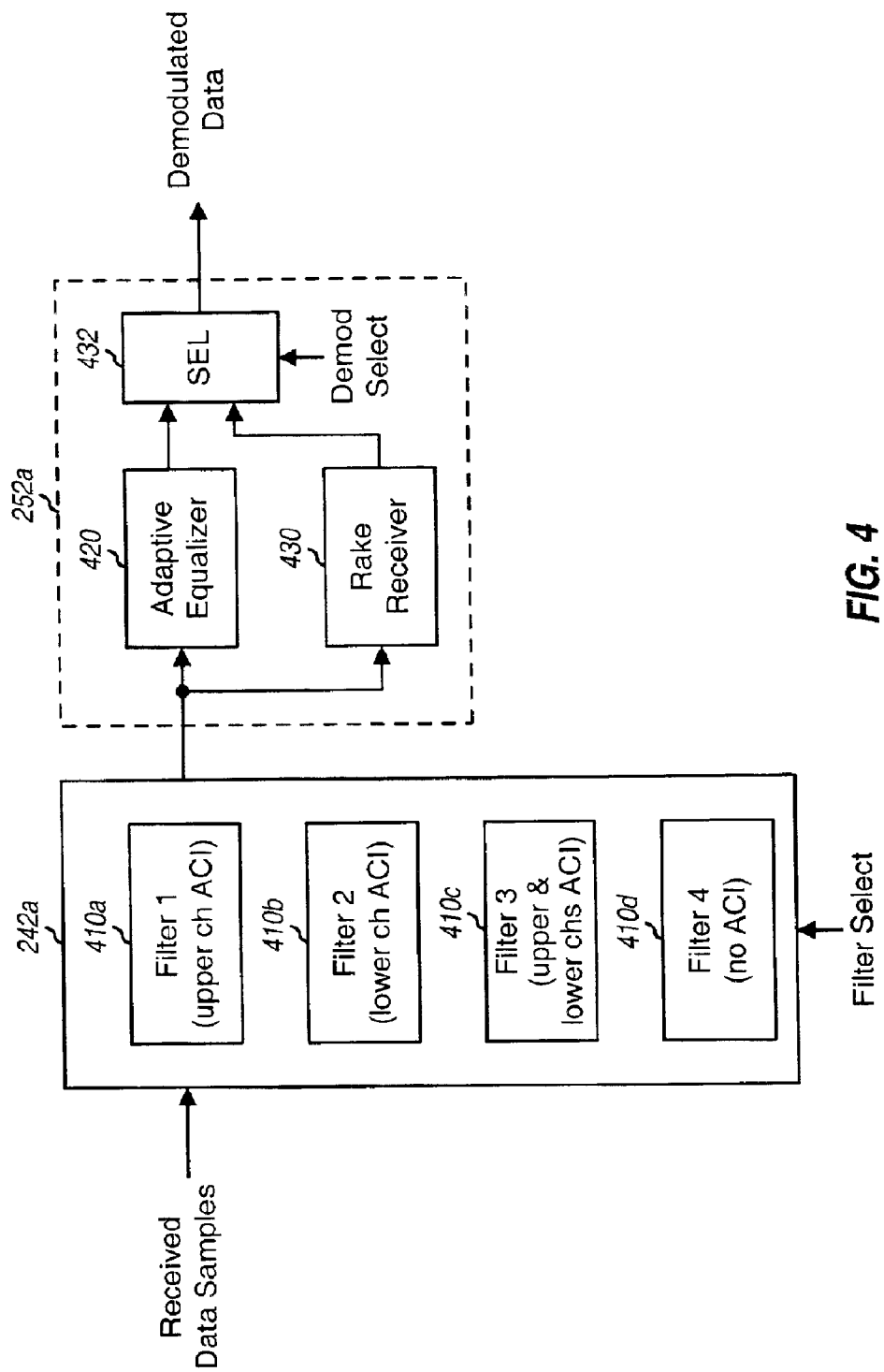
FIG. 4 is a block diagram of a selectable filter implemented as a bank of filters having different responses and which may be selected based on the detected ACI.

FIG. 4 is a block diagram of a selectable filter 242a, which is an embodiment of selectable filter 242 in FIG. 2. The received data samples are provided to a bank of four filters 410a through 410d. Filter 410a may be designed with a response to reject ACI from an upper CDMA channel (e.g., such as the response shown by plot 126 in FIG. 1C), filter 410b may be designed with a response to reject ACI from a lower CDMA channel, filter 410c may be designed with a response to reject ACI from both the upper and lower CDMA channels, and filter 410d may be designed with a suitable response when no ACI is present. At any given moment, one of the four filters 410a through 410d is selected for use based on a filter select control (which may be provided by ACI detector 244). The selected filter 410 then filters the received data samples with its filter response to provide filtered samples, which are then provided as the filtered samples from selectable filter 242a.

FIG. 4 shows a graphical representation of the selectable filter, which is used to provide a better understanding of the filtering to reject ACI. In a practical implementation, only one filter may be implemented and its coefficients may be selected from among a number of sets of coefficients. The specific set of coefficients to be used depends on the desired frequency response, which in turn depends on the presence and locations of the ACI. For example, one FIR filter may be implemented and four possible sets of coefficients may be derived and stored (e.g., in memory 262) for filters 410a, 410b, 410c, and 410d. Upon detection of the presence and locations of the ACI, the proper one of the four sets of coefficients may then be selected and used for the FIR filter.

Since the spectral profile of the ACI is dependent on various factors (e.g., the channel spacing, the receiver filtering, and so on) that are typically time-invariant for a given receiver design and system, the filter coefficients may be derived once and stored for later use. The coefficients may be determined by various means such as computer simulation, an adaptation algorithm applied during field use or manufacturing, and so on. In another embodiment, the coefficients may be sent by the transmitter (e.g., the base station) to the receiver (e.g., the terminal), e.g., during system configuration.

For many receiver designs, the data samples are filtered with a baseband pulse-matched filter to achieve high waveform fidelity prior to subsequent processing (e.g., demodulation by digital demodulator 252). The baseband pulse-matched filter may be implemented with an analog filter or a digital (e.g., FIR) filter. For example, a baseband pulse-matched FIR filter may be implemented by digital pre-processor 230 in FIG. 2.

If the ACI rejection filter is implemented as a fixed FIR filter (e.g., as shown in FIG. 4), then the baseband pulse-matched FIR filter may be combined with the ACI rejection filter. This may be achieved by convolving the coefficients of the baseband pulse-matched FIR filter with the coefficients of the ACI rejection filter to derive coefficients for a new FIR filter that can perform both baseband pulse-matched filtering and ACI rejection.

FIG. 4 also shows a block diagram of a digital demodulator 252a, which is an embodiment of digital demodulator 252 in FIG. 2. In this embodiment, digital demodulator 252a includes an adaptive equalizer 420 operated in parallel with a rake receiver 430, both of which couple to a selector (SEL) 432. Adaptive equalizer 420 may be used to provide equalization to reduce the amount of ISI in the received signal and to maximize SINR. The received signal is typically distorted by the signal processing at the transmitter, the communication channel, and the signal processing at the receiver front-end. Adaptive equalizer 420 may be operated to equalize the overall response for the received signal, thus reducing the amount of ISI. The lower ISI may improve SINR, which may be needed to support higher data rates.

Within digital demodulator 252a, the filtered samples from selectable filter 242 are provided to adaptive equalizer 420 and rake receiver 430. Adaptive equalizer 420 performs equalization on the filtered samples and provides equalized samples. Depending on the processing performed at the transmitter, post processing (e.g., despreading and decovering) may further be performed on the equalized samples to provide recovered symbols. Phase rotation (which is typically achieved via pilot demodulation in a rake receiver) is implicitly achieved by adaptive equalizer 420 after the filter coefficients have been adapted.

Rake receiver 430 may be configured to process one or more multipaths of the received signal to provide recovered symbols. Rake receiver 430 may be configured to perform PN despreading, decovering, and coherent data demodulation (with a recovered pilot) for each of a number of multipaths to provide demodulated symbols for that multipath. Rake receiver 430 then combines demodulated symbols for all multipaths for the same data stream to generate the recovered symbols for that data stream.

The recovered symbols from adaptive equalizer 420 and rake receiver 430 are then provided to selector 432, which selects the recovered symbols from either the adaptive equalizer or the rake receiver based on a demodulator select control (which may be provided by controller 260). The selected recovered symbols are then provided to the subsequent processing stage (e.g., decoder 254).

A digital demodulator that incorporates both an adaptive equalizer and a rake receiver is described in further detail in the U.S. patent application Ser. No. 09/624,319, filed Jul. 24, 2000, entitled "Method and Apparatus for Processing a Modulated Signal Using an Equalizer and a RAKE Receiver".

Figure 5:
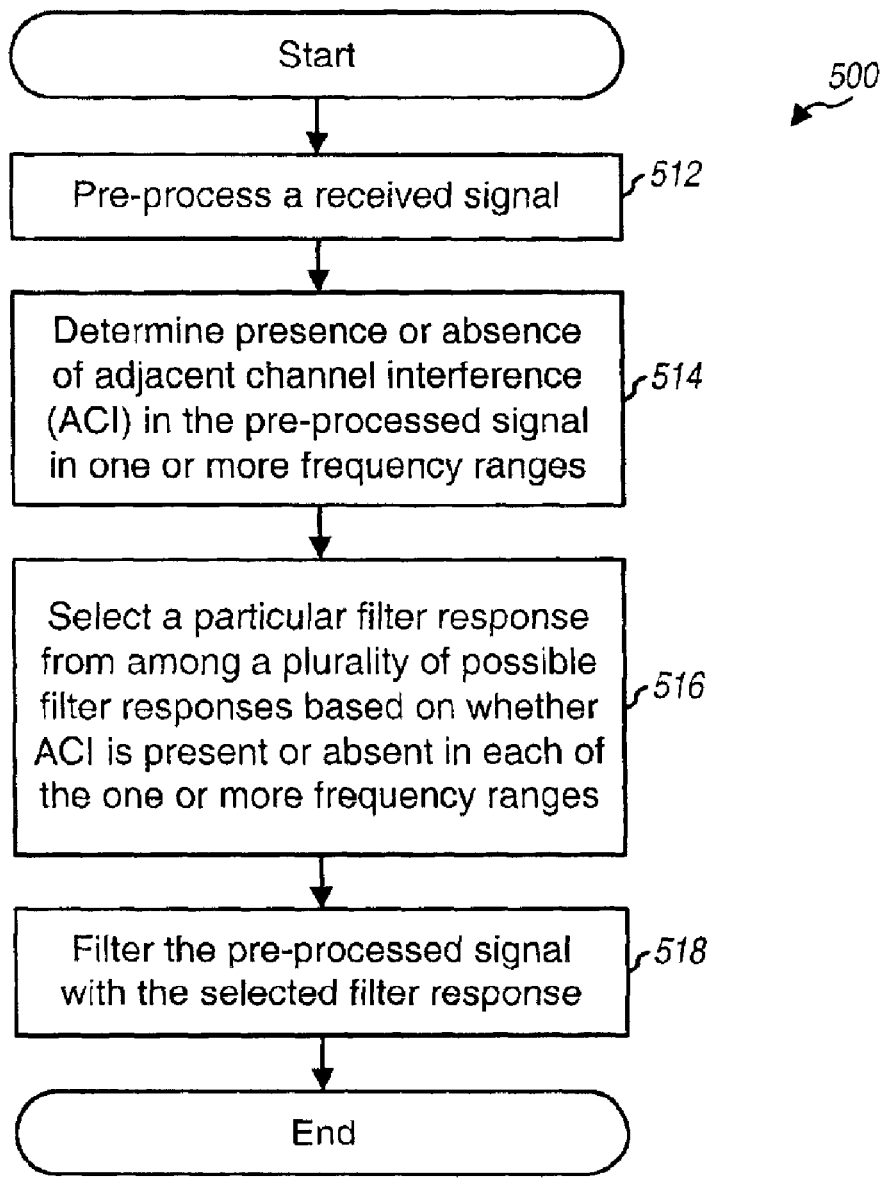
FIG. 5 is a flow diagram of an embodiment of a process to mitigate ACI.

FIG. 5 is a flow diagram of an embodiment of a process 500 to mitigate ACI. Initially, a received signal (which comprises a desired signal component on the desired CDMA channel) is pre-processed by a front-end unit (e.g., received signal processor 220 in FIG. 2) to provide a "pre-processed" signal, at step 512. The pre-processing may include amplification, downconversion, quadrature demodulation, filtering (e.g., anti-alias and/or pulse-matched filtering), digitalization, and so on. The pre-processed signal may comprise the received data samples described above.

The presence or absence of ACI in the pre-processed signal in each of one or more frequency ranges is then determined, at step 514. This may be achieved by filtering the pre-processed signal with a respective ACI detection filter (e.g., a bandpass filter) for each frequency range, estimating the energy of the filtered signal from each ACI detection filter, and comparing the estimated energy for each ACI detection filter against a respective threshold. Alternatively, the presence and frequency locations of the ACI may be determined via signaling (e.g., from the transmitter) or by some other means. The frequency ranges may correspond to a narrow band at an upper band-edge and a lower band-edge of the desired signal component.

A particular filter response is then selected from among a plurality of possible filter responses based on whether ACI is present or absent in each of the one or more frequency ranges, at step 516. The plurality of possible filter responses may be provided by a plurality of sets of filter coefficients (e.g., for a FIR filter) or may be provided by an adaptive filter having coefficients that may be adjusted. The plurality of possible filter responses may include a first filter response selected for use if ACI is determined to be present in the upper band-edge of the desired signal component (e.g., as shown by plot 126 in FIG. 1C), a second filter response selected for use if ACI is determined to be present in the lower band-edge, a third filter response selected for use if ACI is determined to be present in both the upper and lower band-edges, and a fourth filter response selected for use if no ACI is present. The pre-processed signal is then filtered with the selected filter response, at step 518.

The techniques to detect and mitigate ACI described herein may be implemented in various wireless communication systems, including but not limited to CDMA systems, and may be used for the forward link and/or the reverse link. For clarity, these techniques are described specifically for a CDMA system whereby the ACI may appear in a narrow band at the upper and/or lower band-edges of the desired modulated signal. The techniques described herein may also be used for rejection of other narrow band interference regardless of where it may be located within the desired signal bandwidth. Knowledge of the spectral profile of the narrow-band interference may be used to derive the proper responses for the interference detection and/or rejection filters.

The techniques to detect and mitigate ACI described herein may be implemented by various means. For example, these techniques may be implemented in hardware, software, or a combination thereof. For a hardware implementation, the elements used to detect and/or mitigate ACI (e.g., selectable filter 242 and ACI detector 244) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used to detect and/or mitigate ACI may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for mitigating adjacent channel interference (ACI) in a wireless communication system, comprising:
   determining a presence or absence of ACI in each of one or more frequency ranges in a pre-processed signal comprised of a desired signal component, wherein the presence or absence of ACI in the pre-processed signal is determined via signaling from a transmitter;
   selecting a particular filter response from among a plurality of possible filter responses based on the determined presence or absence of ACI in each of the one or more frequency ranges; and
   filtering the pre-processed signal with the selected filter response.

2. The method of claim 1, wherein the plurality of possible filter responses are provided by a plurality of sets of filter coefficients.

3. The method of claim 2, wherein the plurality of sets of filter coefficients are for a finite impulse response (FIR) filter.

4. The method of claim 1, wherein the plurality of possible filter responses include a first filter response selected for use if ACI is determined to be present at an upper band-edge of the desired signal component.

5. The method of claim 1, wherein the plurality of possible filter responses include a second filter response selected for use if ACI is determined to be present at a lower band-edge of the desired signal component.

6. The method of claim 1, wherein the plurality of possible filter responses include a third filter response selected for use if ACI is determined to be present at both an upper band-edge and a lower band-edge of the desired signal component.

7. The method of claim 1, wherein the plurality of possible filter responses include a fourth filter response selected for use if ACI is determined to be absent from the pre-processed signal.

8. The method of claim 1, wherein each of the plurality of possible filter responses is derived to maximize signal-to-noise-and-interference ratio (SINR) based on a respective hypothesis for the ACI in the pre-processed signal.

9. The method of claim 8, wherein each hypothesis is indicative of a hypothesized location and spectral profile for the ACI in the pre-processed signal.

10. A receiver apparatus in a wireless communication system, comprising:
    means for pre-processing a received signal comprised of a desired signal component;
    means for determining a presence or absence of adjacent channel interference (ACI) in the pre-processed signal in each of one or more frequency ranges, wherein the presence or absence of ACI in the pre-processed signal is determined via signaling from a transmitter; and
    means for filtering the pre-processed signal with a particular filter response selected from among a plurality of possible filter responses based on the determined presence or absence of ACI in each of the one or more frequency ranges.

11. The method of claim 10, wherein the presence or absence of ACI in the pre-processed signal on a given CDMA channel is determined via signaling from a base station.

12. The method of claim 11, wherein the presence or absence of ACI in the pre-processed signal on a sync channel is determined via a broadcast message on the sync channel from a base station.

13. The method of claim 11, wherein the presence or absence of ACI in the pre-processed signal on a given CDMA channel is determined via messaging from a base station during system configuration.

14. The method of claim 1, wherein the presence or absence of ACI in the pre-processed signal on a given CDMA channel is determined via signaling from a base station.

15. The method of claim 14, wherein the presence or absence of ACI in the pre-processed signal on a sync channel is determined via a broadcast message on the sync channel from a base station.

16. The method of claim 14, wherein the presence or absence of ACI in the pre-processed signal on a given CDMA channel is determined via from a base station messaging during system configuration.

* * * * *